US012572481B2

(12) United States Patent
Dong et al.

(10) Patent No.: US 12,572,481 B2
(45) Date of Patent: Mar. 10, 2026

(54) INTELLIGENTLY MANAGING SPOOL DATA SETS

(71) Applicant: International Business Machines Corporation, Armonk, NY (US)

(72) Inventors: Xin Xin Dong, Beijing (CN); Mai Zeng, Beijing (CN); Ming Qiao Shang Guan, Beijing (CN); Wei Song, Beijing (CN); Peng Hui Jiang, Beijing (CN); Wen Zhong Liu, Beijing (CN); Laiyin Lowen Ho, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 18/439,851

(22) Filed: Feb. 13, 2024

(65) Prior Publication Data

US 2025/0291742 A1 Sep. 18, 2025

(51) Int. Cl.
*G06F 13/10* (2006.01)
*G06N 20/00* (2019.01)

(52) U.S. Cl.
CPC ............. *G06F 13/10* (2013.01); *G06N 20/00* (2019.01); *G06F 2213/40* (2013.01)

(58) Field of Classification Search
CPC ..................................................... G06F 3/0482
See application file for complete search history.

(56) References Cited

U.S. PATENT DOCUMENTS

| | | | |
|---|---|---|---|
| 9,870,363 B2 | 1/2018 | Joseph et al. | |
| 10,649,988 B1* | 5/2020 | Gold .................. | G06F 16/1794 |
| 2021/0240611 A1 | 8/2021 | Tumanova et al. | |
| 2021/0326225 A1* | 10/2021 | Mueller ............. | G06F 11/1666 |

FOREIGN PATENT DOCUMENTS

CN 110674121 B 8/2023

OTHER PUBLICATIONS

Anonymous, "Smart management system for JES2 spooling environment in mainframe," Sep. 27, 2018, An IP.com Prior Art Database Technical Disclosure, IP.com No. IPCOM000255433D.

(Continued)

*Primary Examiner* — Henry Tsai
*Assistant Examiner* — Juanito C Borromeo
(74) *Attorney, Agent, or Firm* — CANTOR COLBURN LLP; Kelsey M. Skodje

(57) ABSTRACT

A computer-implemented method is provided for intelligently managing simultaneous peripheral operations online (spool) data sets. The computer-implemented method includes collecting historical information and real-time information, training, based on the historical information and the real-time information, first sub models to predict user actions with different spool usage and second sub models to predict user actions with various job statuses, integrating the first and second sub models into a meta model configured to generate policy scripts for system spool management, transforming the policy scripts to executive commands for the system spool management and automatically issuing and executing the executive commands for the system spool management.

20 Claims, 9 Drawing Sheets

(56)     References Cited

OTHER PUBLICATIONS

Broadcom "Clean Spool and Job Log Files," https://techdocs. broadcom.com/us/en/ca-enterprise-software/intelligent-automation/ autosys-workload-automation/12-1-01/administrating/ae-administration/ maintain-the-agent/clean-spool-and-job-log-files.html (Retrieved Dec. 21, 2023), 3 pages.

Broadcom "Spool File Maintenance" https://techdocs.broadcom. com/us/en/ca-enterprise-software/intelligent-automation/workload-automation-system-agent/11-3/configuring/maintain-spool-and-log-files/spool-file-maintenance.html (retrieved Dec. 21, 2023), 5 pages.

IBM "Dynamic addition and deletion of Spool volumes" https:// www.ibm.com/docs/en/zos/2.2.0?topic=space-dynamic-addition-deletion-spool-volumes, (retrieved Dec. 21, 2023) 2 pages.

IBM, "PFA_JES_Spool_Usage" https://www.ibm.com/docs/en/zos/ 2.1.0?topic=checks-pfa-jes-spool-usage (retrieved Dec. 21, 2023), 6 pages.

Rocket Software "JES Spool Monitor," https://docs.rocketsoftware. com/bundle/tmonzos_49/page/hgj1644024600861.html (Retrieved Dec. 21, 2023) 2 pages.

* cited by examiner

300

Collect historical and real-time data — 301

Training sub models — 302

Integrating sub models into meta model — 303

Transforming policy scripts of meta model to executive commands — 304

Issuing and executing executive commands — 305

Collecting and storing output of each sub model by timestamp as historical data — 306

Updating meta model — 307

Job Information

| Job name | Job type | Job start | Job CPU utilization | Initiator | Job spool usage | Duration | Completed |
|----------|----------|-----------|--------------------|-----------|-----------------|----------|-----------|
| LDAPJ801 | STC | 20230823 | 1% | JES | 8274 | 3d | N |
| AZK8 | STC | 20230810 | 0% | JES | 7M | 10d | Y |
| WLMAI075 | Batch | 20230814 | 2% | WLM | 200T | 10m | Y |
| DBWGDBM1 | STC | 20230818 | 0.02% | JES | 514T | 5d | N |

501

Spool Information

| Time | Job counts (completed) | Spool usage | Total CPU utilization |
|------|-----------------------|-------------|----------------------|
| 20230811.23:30:00 | 2000 | 45% | 32% |
| 20230811.23:35:00 | 2500 | 55% | 33% |
| 20230811.23:40:00 | 2800 | 70% | 35% |
| 20230811.23:45:00 | 3500 | 90% | 30% |

| Time Stamp | M1 | M2 | M3 |
|---|---|---|---|
| T1 | V11 | V12 | V13 |
| T2 | V21 | V22 | V23 |

```
##Defining Base models
def base_models = (("Logistic Regression", m1), ("knn",m2), ("gbdt,m3))

##Divide data to training data, validation data and testing data for every model
X_train_all,X_test, Y_train_all, Y_test = train_test_split(X, Y, test_size=0.3, random_state=1)
X_train,X_validate, Y_train, Y_validate = train_test_split(X_train_all,Y_train_all,test_size=0.4,random_state=1)

##Train base models on train set and make predictions on validation set
meta_validation_X=list()
for model in base_models():
    model.fit(X_train, y_train)
    val_predictions = model.predict_proba(X_val)
    meta_validation_X.append(val_predictions)
meta_validation_X = np.hstack(meta_validation_X)

##Creating and training on base model predictions
final_estimator = meta_extimator.fit(mata_validation_X,Y_validate)

##Predictions
final_X = list()
for model in base_models():
    test_predictions_X = model.predict_proba(X_test)
    final_X.append(test_predictions_X)
final_X = np.hstack(final_X)

Y_prediction = final_estimator.predit(final_X)
```

FIG. 8

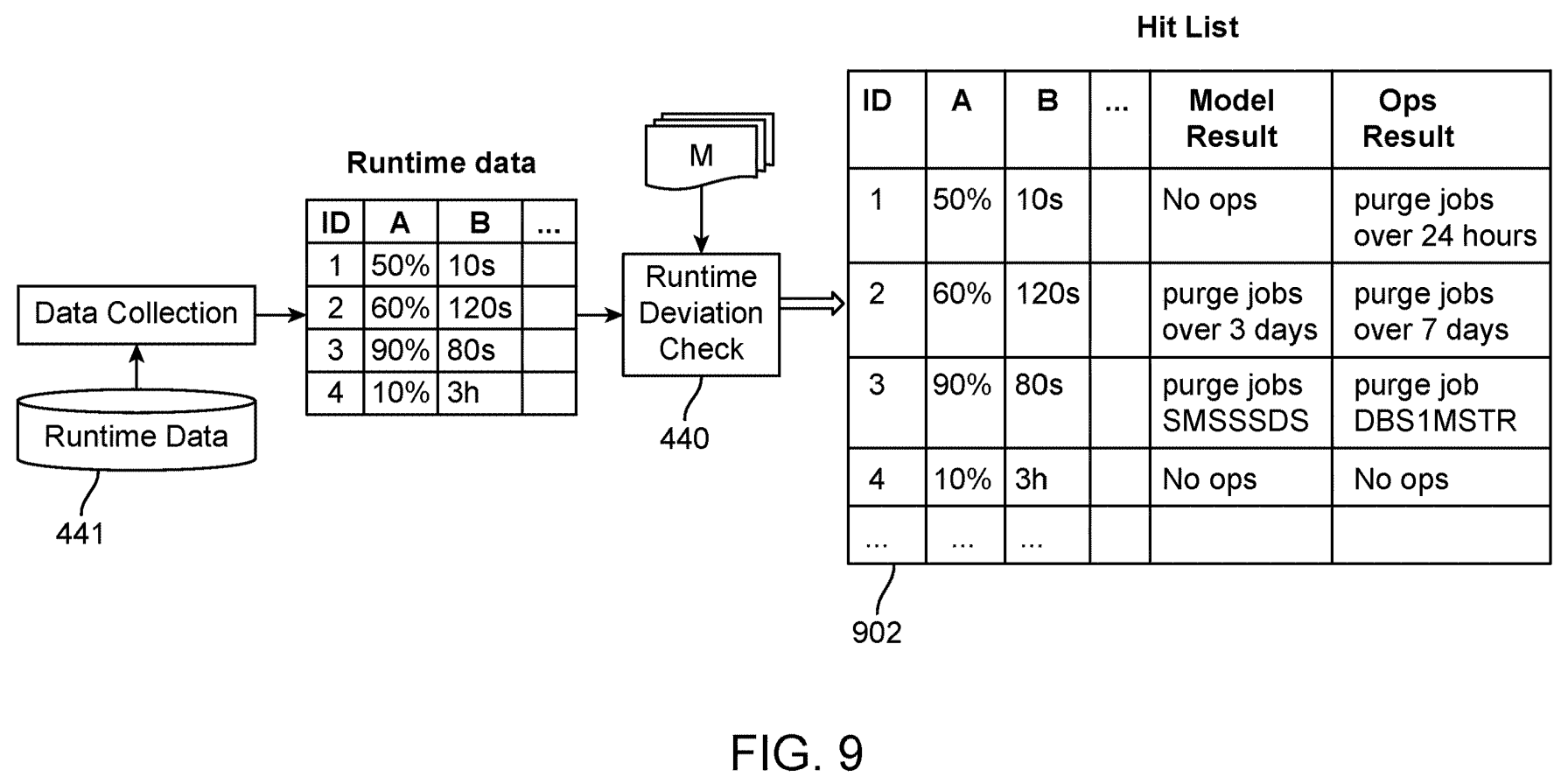

Hit List

| ID | A | B | ... | Model Result | Ops Result |
|---|---|---|---|---|---|
| 1 | 50% | 10s | | No ops | purge jobs over 24 hours |
| 2 | 60% | 120s | | purge jobs over 3 days | purge jobs over 7 days |
| 3 | 90% | 80s | | purge jobs SMSSSDS | purge job DBS1MSTR |
| 4 | 10% | 3h | | No ops | No ops |
| ... | ... | ... | | | |

902

M

Runtime Deviation Check — 440

Runtime data

| ID | A | B | ... |
|---|---|---|---|
| 1 | 50% | 10s | |
| 2 | 60% | 120s | |
| 3 | 90% | 80s | |
| 4 | 10% | 3h | |

Data Collection

Runtime Data — 441

FIG. 9

INTELLIGENTLY MANAGING SPOOL DATA SETS

BACKGROUND

The present invention generally relates to data storage management in computing systems. More specifically, the present invention relates to intelligently managing spool data sets for data storage management.

Large scale storage systems are currently facing a number of critical challenges. These challenges include an unchecked growth in data volumes leading to storage cost overruns, the immaturity and complexity of big data platforms, and the need to obtain insight from stored data. In addition, storage costs are increasing for companies engaging in big data analytics initiatives even though the cost of storage hardware has been declining each year (these cost declines do not keep pace with the rate of data growth).

Generally, there are several approaches being used to tackle the storage space problems. For example, some companies choose to store all of their data on low-cost tape. Other companies choose an advanced data compression technique to make sure more data can be stored within less space. Still other companies choose to remove or "prune" the old data and keep only the newer and more relevant data in order to manage space.

SUMMARY

According to an aspect of the disclosure, a computer-implemented method is provided for intelligently managing simultaneous peripheral operations online (spool) data sets. The computer-implemented method includes collecting historical information and real-time information, training, based on the historical information and the real-time information, first sub models to predict user actions with different spool usage and second sub models to predict user actions with various job statuses, integrating the first and second sub models into a meta model configured to generate policy scripts for system spool management, transforming the policy scripts to executive commands for the system spool management and automatically issuing and executing the executive commands for the system spool management. In an additional or alternative embodiment, spool data set usage can be managed transparently and jobs can be managed intelligently based on job statuses.

According to an aspect of the disclosure, a computer program product for intelligently managing simultaneous peripheral operations online (spool) data sets is provided. The computer program product includes one or more computer readable storage media having computer readable program code collectively stored on the one or more computer readable storage media. The computer readable program code is executed by a processor of a computer system to cause the computer system to perform a method. The method includes collecting historical information and real-time information, training, based on the historical information and the real-time information, first sub models to predict user actions with different spool usage and second sub models to predict user actions with various job statuses, integrating the first and second sub models into a meta model configured to generate policy scripts for system spool management, transforming the policy scripts to executive commands for the system spool management and automatically issuing and executing the executive commands for the system spool management. In an additional or alternative embodiment, spool data set usage can be managed transparently and jobs can be managed intelligently based on job statuses.

According to an aspect of the disclosure, a computing system is provided and includes a processor, a memory coupled to the processor and one or more computer readable storage media coupled to the processor. The one or more computer readable storage media collectively contain instructions that are executed by the processor via the memory to implement a method for intelligently managing simultaneous peripheral operations online (spool) data sets including collecting historical information and real-time information, training, based on the historical information and the real-time information, first sub models to predict user actions with different spool usage and second sub models to predict user actions with various job statuses, integrating the first and second sub models into a meta model configured to generate policy scripts for system spool management, transforming the policy scripts to executive commands for the system spool management and automatically issuing and executing the executive commands for the system spool management. In an additional or alternative embodiment, spool data set usage can be managed transparently and jobs can be managed intelligently based on job statuses.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 are tables that can be built by a data collection or monitor module of the system architecture of FIG. 4 in accordance with one or more embodiments;

FIG. 6 is a table of model output as historical data in accordance with one or more embodiments;

FIG. 8 is a layout of exemplary logic for model integration in accordance with one or more embodiments; and FIG. 9 is a flow diagram illustrating a runtime deviation checking process in accordance with one or more embodiments.

Figure 1:
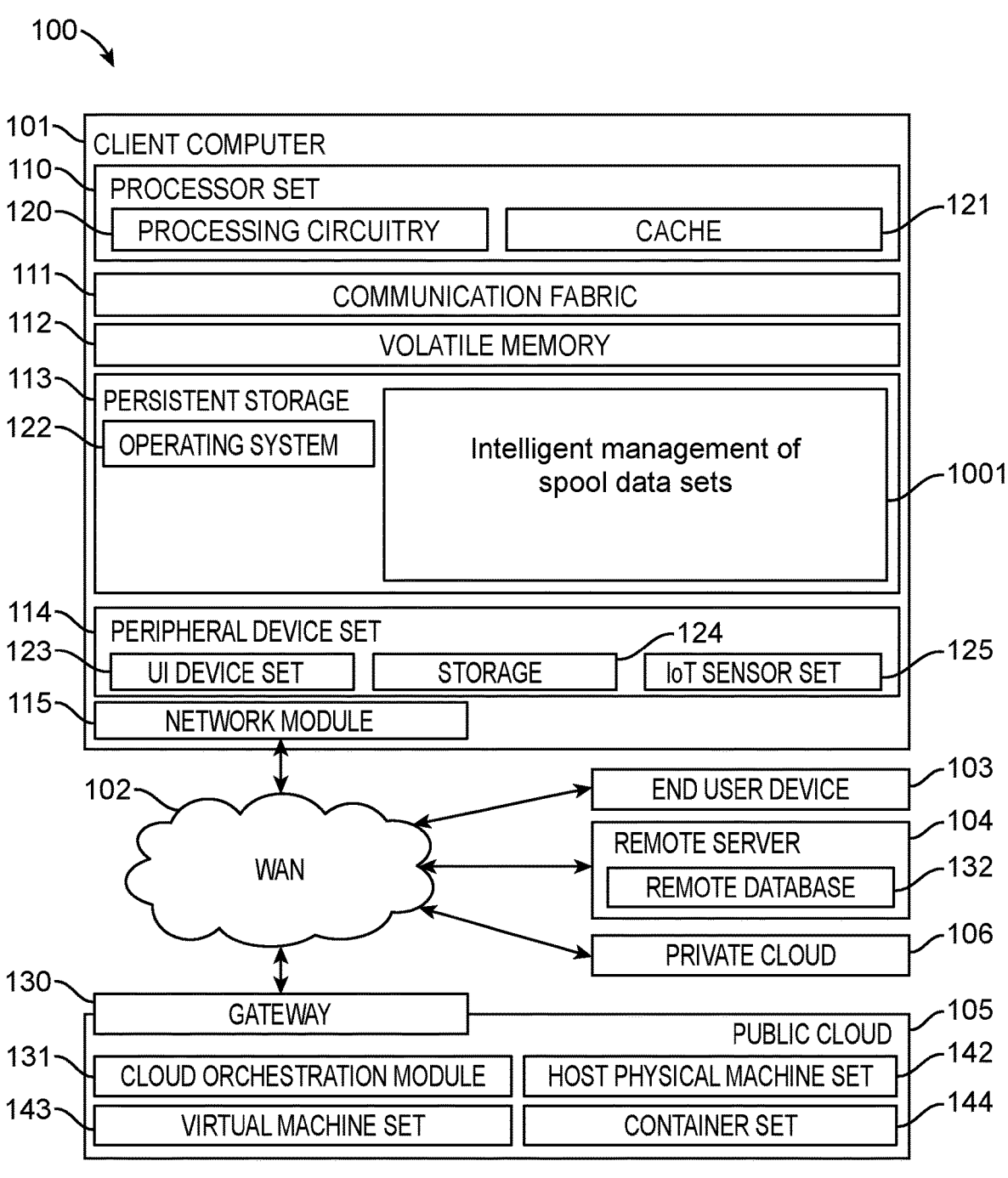
FIG. 1 is a schematic diagram of a computing environment for executing a computer-implemented method for intelligently managing simultaneous peripheral operations online (spool) data sets in accordance with one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

According to an aspect of the disclosure, a computer-implemented method is provided for intelligently managing simultaneous peripheral operations online (spool) data sets. The computer-implemented method includes collecting historical information and real-time information, training, based on the historical information and the real-time information, first sub models to predict user actions with different spool usage and second sub models to predict user actions with various job statuses, integrating the first and second sub models into a meta model configured to generate policy scripts for system spool management, transforming the policy scripts to executive commands for the system spool management and automatically issuing and executing the executive commands for the system spool management. In an additional or alternative embodiment, spool data set usage can be managed transparently and jobs can be managed intelligently based on job statuses.

The historical information and the real-time information include job information, spool usage information and user activity information, the training of the first sub models to predict the user actions with the different spool usage is based on the spool usage information and the user activity information and the training of the second sub models to predict user actions with various job statuses is based on the job information and the user activity information. Job information, spool usage and user activities can therefore influence transparent management of spool usage and intelligent management of jobs.

The spool usage information includes spool data set usage information, total CPU utilization information and job count information. The spool usage information is comprehensive spool usage information.

The user activity information includes purge spool frequency information, purge size information and purge time information. The user activity information is comprehensive user activity information.

The job information includes job type information, job name information, job start time information, job CPU information, initiator information, job spool information, and job abend information. The job information is comprehensive job information.

The computer-implemented method further includes collecting and storing an output of each of the first and second sub models by a timestamp as the historical information. This provides for feedback to improve sub model and meta model performance.

The computer-implemented method further includes iteratively updating the meta model by calculating a real hit ratio for the meta model and determining whether the real hit ratio is below and predefined threshold. This provides for feedback to improve meta model performance.

According to an aspect of the disclosure, a computer program product for intelligently managing simultaneous peripheral operations online (spool) data sets is provided. The computer program product includes one or more computer readable storage media having computer readable program code collectively stored on the one or more computer readable storage media. The computer readable program code is executed by a processor of a computer system to cause the computer system to perform a method. The method includes collecting historical information and real-time information, training, based on the historical information and the real-time information, first sub models to predict user actions with different spool usage and second sub models to predict user actions with various job statuses, integrating the first and second sub models into a meta model configured to generate policy scripts for system spool management, transforming the policy scripts to executive commands for the system spool management and automatically issuing and executing the executive commands for the system spool management. In an additional or alternative embodiment, spool data set usage can be managed transparently and jobs can be managed intelligently based on job statuses.

The historical information and the real-time information include job information, spool usage information and user activity information, the training of the first sub models to predict the user actions with the different spool usage is based on the spool usage information and the user activity information and the training of the second sub models to predict user actions with various job statuses is based on the job information and the user activity information. Job information, spool usage and user activities can therefore influence transparent management of spool usage and intelligent management of jobs.

The spool usage information includes spool data set usage information, total CPU utilization information and job count information. The spool usage information is comprehensive spool usage information.

The user activity information includes purge spool frequency information, purge size information and purge time information. The user activity information is comprehensive user activity information.

The job information includes job type information, job name information, job start time information, job CPU information, initiator information, job spool information, and job abend information. The job information is comprehensive job information.

The method further includes collecting and storing an output of each of the first and second sub models by a timestamp as the historical information. This provides for feedback to improve sub model and meta model performance.

The method further includes iteratively updating the meta model by calculating a real hit ratio for the meta model and determining whether the real hit ratio is below and predefined threshold. This provides for feedback to improve meta model performance.

According to an aspect of the disclosure, a computing system is provided and includes a processor, a memory coupled to the processor and one or more computer readable storage media coupled to the processor. The one or more computer readable storage media collectively contain instructions that are executed by the processor via the memory to implement a method for intelligently managing simultaneous peripheral operations online (spool) data sets including collecting historical information and real-time information, training, based on the historical information and the real-time information, first sub models to predict user actions with different spool usage and second sub models to predict user actions with various job statuses, integrating the first and second sub models into a meta model configured to generate policy scripts for system spool management, transforming the policy scripts to executive commands for the system spool management and automatically issuing and executing the executive commands for the system spool management. In an additional or alternative embodiment, spool data set usage can be managed transparently and jobs can be managed intelligently based on job statuses.

The historical information and the real-time information include job information, spool usage information and user activity information, the training of the first sub models to predict the user actions with the different spool usage is based on the spool usage information and the user activity information and the training of the second sub models to predict user actions with various job statuses is based on the job information and the user activity information. Job information, spool usage and user activities can therefore influence transparent management of spool usage and intelligent management of jobs.

The spool usage information includes spool data set usage information, total CPU utilization information and job count information. The spool usage information is comprehensive spool usage information.

The user activity information includes purge spool frequency information, purge size information and purge time information. The user activity information is comprehensive user activity information.

The job information includes job type information, job name information, job start time information, job CPU information, initiator information, job spool information, and job abend information. The job information is comprehensive job information.

The method for intelligently managing simultaneous peripheral operations online (spool) data sets further includes collecting and storing an output of each of the first and second sub models by a timestamp as the historical information. This provides for feedback to improve sub model and meta model performance.

The method for intelligently managing simultaneous peripheral operations online (spool) data sets further includes iteratively updating the meta model by calculating a real hit ratio for the meta model and determining whether the real hit ratio is below and predefined threshold. This provides for feedback to improve meta model performance.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, a computer or computing device 100 that implements a computer-implemented method for intelligently managing simultaneous peripheral operations online (spool) data sets. The computer or computing device 100 of FIG. 1 contains an example of an environment for the execution of at least some of the computer code involved in performing the inventive methods, such as the block 1001 of the computer-implemented method for intelligently managing simultaneous peripheral operations online (spool) data sets. In addition to the computer-implemented method for intelligently managing simultaneous peripheral operations online (spool) data sets, the computer or computing device 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the computer-implemented method of block 1001, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of the computer-implemented method, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

The processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In the computer-implemented method, at least some of the instructions for performing the inventive methods may be stored in the block 1001 of the computer-implemented method in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the block 1001 of the computer-implemented method typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Turning now to an overview of technologies that are more specifically relevant to aspects of the invention, modern computing systems use a job entry subsystem (JES) to receive jobs into the operating system (OS), to schedule the jobs for processing and to control their output processing. The JES is the component of the OS that provides supplementary job management, data management and task management functions such as scheduling, control of job flow and the reading and writing of input and output streams on auxiliary storage devices concurrently with job execution.

In these or other cases, the modern computing systems manage work as tasks and subtasks. Both transactions and batch jobs are associated with an internal task queue that is managed on a priority basis. The JES works on the front end of program execution to prepare work to be executed and is also active on the back end of the program execution to help clean up after work is performed. This activity includes managing the printing of output generated by active programs. More specifically, the JES manages the input and output job queues and data. The JES can queue jobs waiting to be executed and can provide multiple queues for various purposes. The JES can also queue jobs for an initiator, which is a system program that requests the next job in the appropriate queue.

In some cases, the JES can optionally send output to a printer or save it on a spool. Here, the JES uses one or more disk data sets for spooling, which is the process of reading and writing input and output streams on auxiliary storage devices, concurrently with job execution, in a format convenient for later processing or output operations. The term "spool" is an acronym that stands for simultaneous peripheral operations online. The JES combines multiple spool data sets (if present) into a single conceptual data set. The internal format is not in a standard access-method format and is not written or read directly by applications. Input jobs and printed output from many jobs are stored in the single (conceptual) spool data set. In a small system, the spool data sets might be a few hundred cylinders of disk space. In a large installation, there might be many complete volumes of disk space.

It has been found, however, that a spool can be full. This can prevent jobs from being submitted and can prevent users from logging onto the system. When this happens, typically, the only way to release spool space is to drain the spool volume by, for example, deleting jobs that are overdue or purging jobs manually. In either case, releasing the spool space can be arbitrary.

Turning now to an overview of the aspects of the invention, one or more embodiments of the invention address the above-described shortcomings of the prior art by providing for a method to transparently manage spool data set intelligently by dynamically adjusting spool usage. That is, spool data set usage can be managed transparently and the jobs can be managed intelligently based on job statuses. A monitor module collects job information, monitors spool usage and monitors user activities for historical and real time data. A data training module trains a suite of models about spool health based on the data collected by the monitor module. A model integration module builds a meta model to train a model to predict user actions based on sub models built by the data training module. A runtime deviation check checks runtime data by comparing it with predicted data. A matched record will be put into a hit list as well as a model predict result. System programmers can use this runtime result to perform analysis. An adjust module converts a solution to commands and issues job system commands to drain the spool data sets.

The above-described aspects of the invention address the shortcomings of the prior art by providing a computer-implemented method for intelligently managing simultaneous peripheral operations online (spool) data sets. The computer-implemented method includes collecting historical information and real-time information, training, based on the historical information and the real-time information, first sub models to predict user actions with different spool usage and second sub models to predict user actions with various job statuses and integrating the first and second sub models into a meta model configured to generate policy scripts for system spool management. The computer-implemented method further includes transforming the policy scripts to executive commands for the system spool management and automatically issuing and executing the executive commands for the system spool management.

Figure 2:
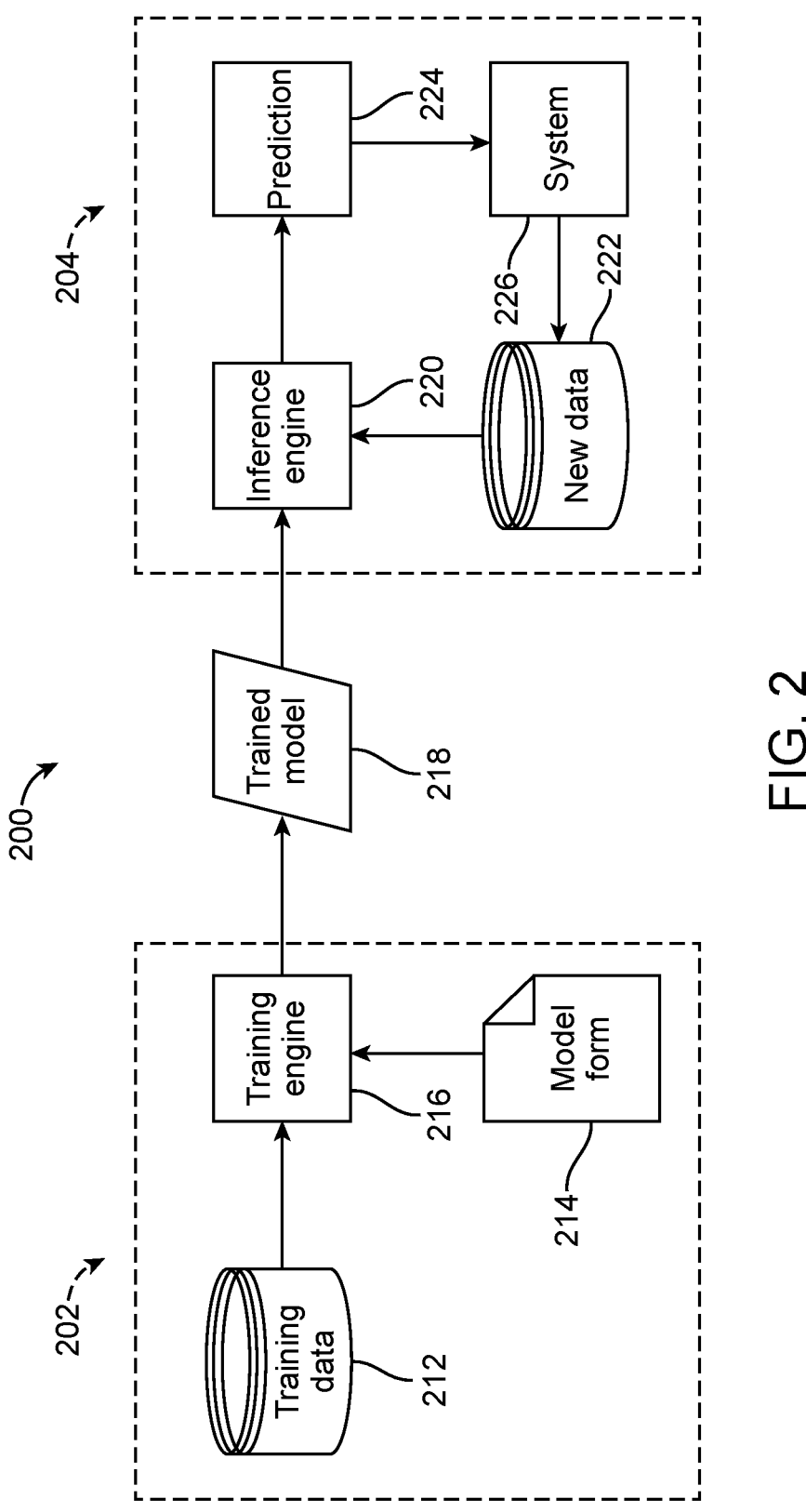
FIG. 2 is a block diagram of components of a machine learning training and inference system according to one or more embodiments.

Turning now to a more detailed description of aspects of the present invention, FIG. 2 depicts a block diagram of components of a machine learning training and inference system 200. The machine learning training and inference system 200, in accordance with one or more embodiments of the invention, can utilize machine learning techniques to perform tasks, such as a computer-implemented method for intelligently managing simultaneous peripheral operations online (spool) data sets. Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information during a web conference, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Figure 3:
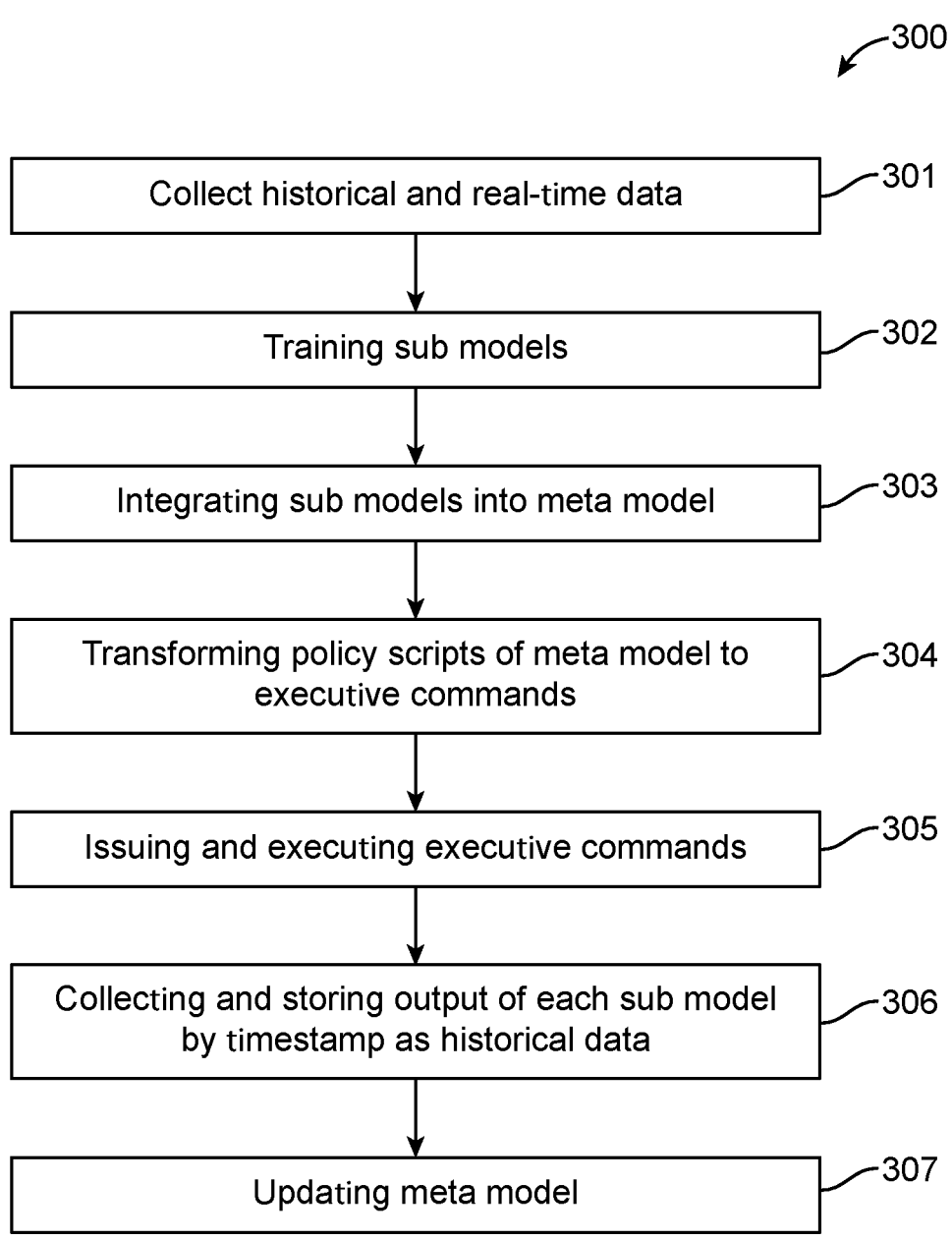
FIG. 3 is a flow diagram illustrating a computer-implemented method for intelligently managing simultaneous peripheral operations online (spool) data sets in accordance with one or more embodiments.

With reference to FIG. 3, a computer-implemented method 300 is provided for intelligently managing simultaneous peripheral operations online (spool) data sets. As shown in FIG. 3, the computer-implemented method 300 includes collecting historical information and real-time information (block 301), training, based on the historical information and the real-time information, first sub models to predict user actions with different spool usage and second sub models to predict user actions with various job statuses (block 302) and integrating the first and second sub models into a meta model configured to generate policy scripts for system spool management (block 303). The computer-implemented method 300 further includes transforming the policy scripts to executive commands for the system spool management (block 304) and automatically issuing and executing the executive commands for the system spool management (block 305). In addition, the computer-implemented method 300 can also include at least one of collecting and storing an output of each of the first and second sub models by a timestamp as the historical data (block 306) and iteratively updating the meta model by calculating a real hit ratio for the meta model and determining whether the real hit ratio is below and predefined threshold (block 307).

As used herein, the historical information and the real-time information can include job information, spool usage information and user activity information. In these or other cases, the training of the first sub models of block 302 to predict the user actions with the different spool usage can be based on the spool usage information and the user activity information and the training of the second sub models of block 302 to predict user actions with various job statuses can be based on the job information and the user activity information. In accordance with one or more embodiments, the spool usage information can include at least spool data set usage information, total CPU utilization information and job count information, the user activity information can include at least purge spool frequency information, purge size information and purge time information and the job information can include at least job type information, job name information, job start time information, job CPU information, initiator information, job spool information, and job abend information.

Figure 4:
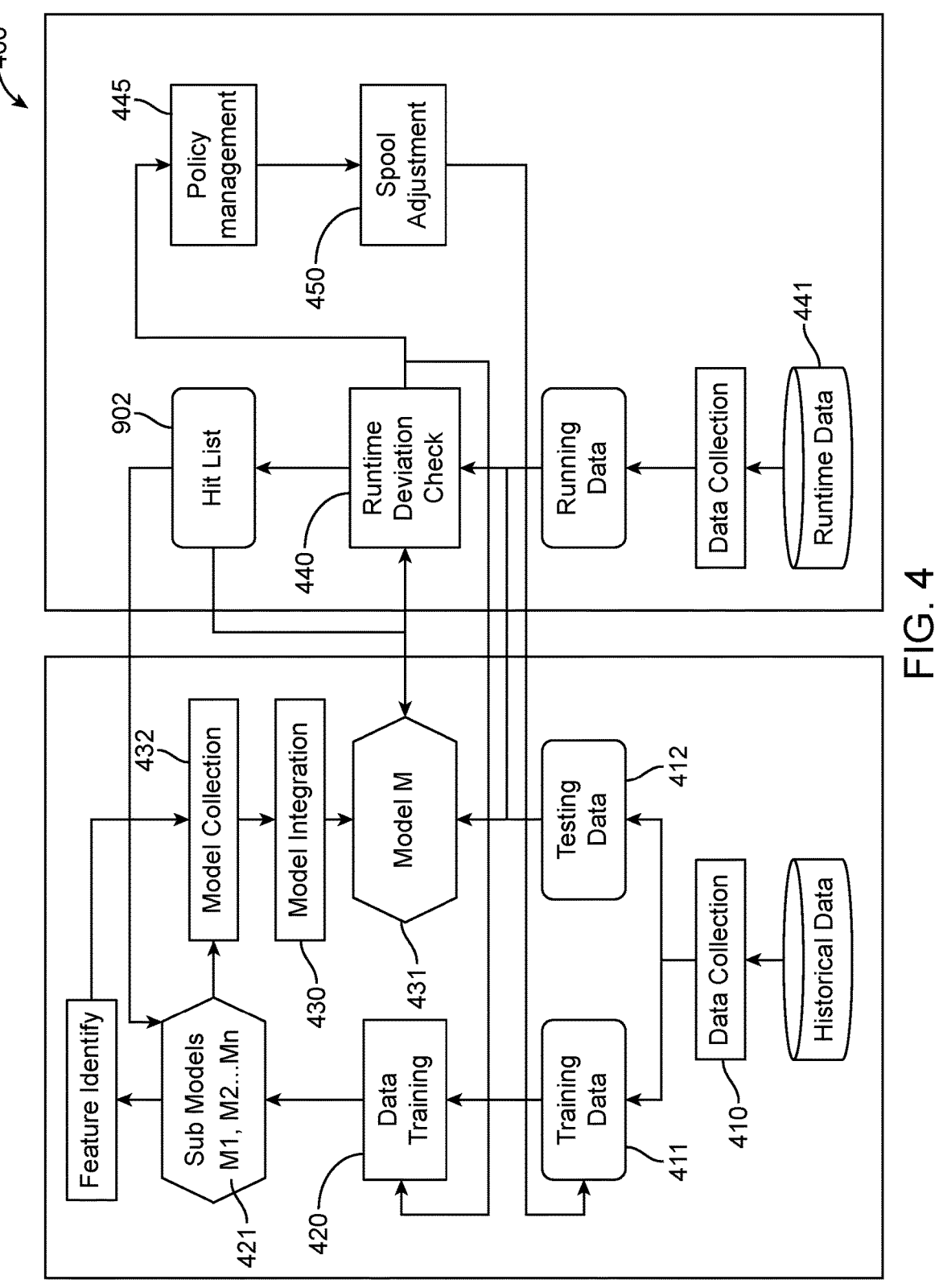
FIG. 4 is a schematic diagram of a system architecture for executing the computer-implemented method of FIG. 3 in accordance with one or more embodiments.

With reference to FIG. 4, a system architecture 400 is provided to execute the computer-implemented method 300 of FIG. 3. As shown in FIG. 4, the system architecture 400 includes a data collection or monitor module 410, a data training module 420, a model integration module 430, a runtime deviation check element 440 and an adjustment module 450. The data collection or monitor module 410 collects job information and monitors spool usage and user activities for historical and real time data. The data training module 420 trains a suite of models 421 (i.e., sub models 421) about spool health based on the data collected by the monitor module 410. The model integration module 430 builds a meta model 431 that is trained to predict user actions based on the sub models 421 built by the data training module 420. The runtime deviation check element 440 checks runtime data 441 by comparing it with predicted data. A matched record will be put into a hit list along with a model prediction result. System programmers can use the runtime results to perform further analysis. The adjustment module 450 converts solutions to automatically executable commands and can automatically issue job system commands to drain spool data sets.

With continued reference to FIG. 4 and with additional reference to FIG. 5, the data collection or monitor module 410 collects and formats historical data 411 or information and real-time data 412 or information. The data being collected can include job layer data or information, spool layer data or information and user activity data or information. As shown in the table 501 of FIG. 5, the job layer data or information can include, but is not limited to, job type information, job name information, job start time information, job CPU utilization information, initiator information, job spool usage information and job abends information. As shown in table 502 of FIG. 5, the spool layer data or information can include, but is not limited to, spool data set usage information, total CPU utilization information, job counts (completed/running) information, etc. The user activity information can include, but is not limited to, purge spool frequency information, purge size information, purge time information, etc. in any case, continuous data can be formatted to different classes.

The data training module 420 trains a suite of models 421 about spool health based on the data collected by the data collection or monitor module 410. There can be multiple kinds of sub models <M1, M2, . . . , Mn>. These include a spool usage analysis module (SUAM), which is configured to predict user actions based on spool usage. In this module, a sub model 421 is trained to predict user actions with different spool usage. Features of the sub model 421 include, but are not limited to, spool usage, spool increasement per interval and spool initiator. A feature map for this sub model 421 can be <S1, S2, S3, . . . . Sn>. Another sub model 421 can be a job analysis module (JAM), which detects and analyzes job deviation based on historical data and which is configured to predict user actions with varieties of job statuses. In this module, users can get a prediction about the spool increasement of jobs and user actions. A feature map for this sub model 421 can be <J1, J2, J3, . . . . Jn, job deviation>. Within the data training module 420, each sub model 421 is provided with a rating (e.g., good/normal/bad) for system perspective per time interval, and each sub model 421 can predict user actions from different perspective. Each of the sub models 421 can be iteratively retrained based on model accuracies and eventually combined to generate policy for system spool management.

Figure 7:
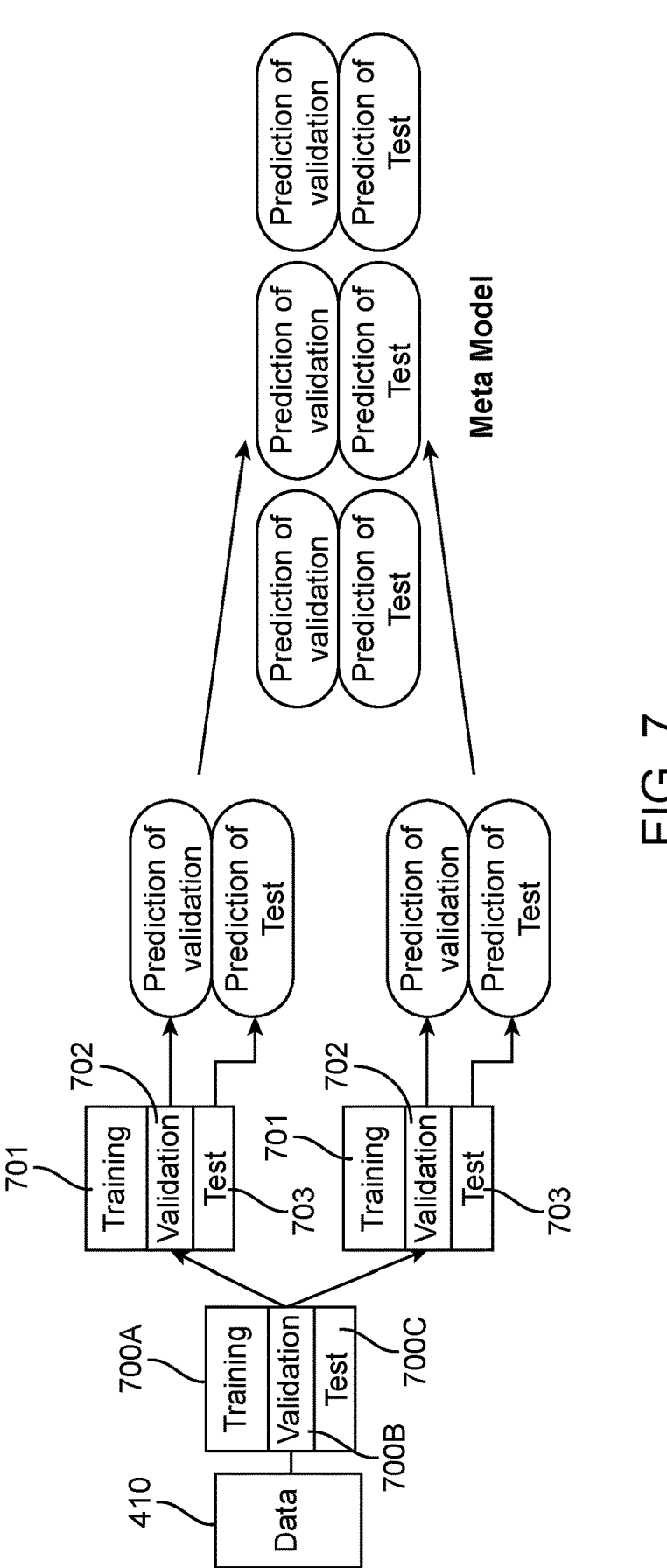
FIG. 7 is a schematic illustration of a training, validating and testing process for sub models and a meta model of the system architecture of FIG. 4 in accordance with one or more embodiments.

With continued reference to FIG. 4 and with additional reference to FIGS. 6-8, the model integration module 430 collects and stores an output 432 of each sub model 421 by timestamp as historical data in a table 601 as shown in FIG. 6. In addition, policy scripts 445 from a meta model 431 can be generated and transformed into automatically executable and automatically issuable commands. As shown in FIG. 7, multiple sub models 421 are integrated into the meta model 431 based on validation and testing results. At an initial time, historical and real-time data are divided into training data 700A, validation data 700B and test data 700C for every sub model 421. Training sets 701 are then used for training base models for every scope in the system. A validation 702 set is then used to verify model accuracy for each sub model 421 with an output prediction of every validation set 702. A test set 703 is used to test the sub model 421 with an output prediction of every test set 703. Lastly, a validation set 702 is used to train the meta model 431 and testing is carried out on the test data 703 for the meta model 431. Exemplary logic for the training, validation and testing of each of the sub models 421 and the meta model 431 is provided in the exemplary code 801 as shown in FIG. 8.

In accordance with embodiments, the sub models 421 and the meta model 431 can be two-layer models. The sub models 421 are used for different squads such as, for example, a case where one sub model 421 can be used for spool usage analysis and another sub model 421 can be used for job analysis. In this case, the sub model 421 used for spool usage analysis collects information related to spool usage, such as spool increasement, runtime, workload stress, etc., and predicts system health from a spool perspective. The job analysis sub model 421 collects information for every job, identifies if a job is a normal job or an abnormal job and predicts system health from a job perspective. The training data 411 in these or other cases can be used for the training of each of the sub models 421 and is selected and combined based on the model requirements whereas the validation data is used for the testing of each of the sub models 421. The meta model 431 is second layer model and uses validation data from the sub models 421 to train a final model to predict a system action. Testing data is then used to test the final model. In this way, the meta model 431 can ensure the whole system health, but also the health of each sub model 421.

With continued reference to FIG. 4 and with additional reference to FIG. 9, the runtime deviation check element 440 uses the meta model 431 to obtain a predicted policy for intelligent spool management. For each user action, historical data is divided into a training dataset 1 that is to be used for training and a testing dataset 1 that is to be used for verification. For runtime data 441, if the data are untrained, an appropriate sub model 421 is used to predict a user action and the meta model 431 is used to obtain a prediction of user actions with the result output to the runtime deviation check element 440. A record and results will be stored in the hit list 902, which is used to calculate a real hit ratio for the current sub model 421. Feedback is directed to the sub model 421 if the hit ratio is below a predefined threshold.

In accordance with embodiments, the records stored in the hit list 902 are statistic data of a current timestamp (i.e., a current system status). The result stored in the hit list 902 is the predicted and actual or fine-tuned user actions.

In an exemplary case, spool usage can be 37% and there is a job with 2.99% usage. With the meta model 431, the meta model 431 can determine that the job usually needs 3% spool usage. Thus, the job is provided with a prediction for user actions. This prediction is "Purge job #BR14A" and "Check system status with Models and verify the system runs well without any abnormal."

In another exemplary case, spool usage can be 99% and users cannot log on to the system. Previously, users in this situation would have to take the following actions: (1) issue !J2SP to find jobs with highest spool usage and (2) purge the jobs with the highest spool usage and delete job outputs older than 24 hours. In this disclosure, the following actions would be taken: (1) issued !J2SP to find jobs with highest spool usage, (2) determine if a job has run previously, if so, analyze the job status with historical trends, get an abnormal rating, so the job will be left; repeat for the other jobs, and get a pre-action list and (3) purge the jobs with abnormal status to drain spool datasets.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for intelligently managing simultaneous peripheral operations online (spool) data sets, the computer-implemented method comprising:
    collecting historical information and real-time information;
    training, based on the historical information and the real-time information, first sub models to predict first user actions with different spool usage, the first user actions comprising a job purge action and a system check action;
    training, based on the historical information and the real-time information, second sub models to predict second user actions with various job statuses, the second user actions comprising issuing a command to find jobs with highest spool usages, determining if a job has run previously and, if so, analyzing a job status with historical trends, getting an abnormal rating so the job will be left, repeating the determining, the analyzing and the getting of the abnormal rating for the other jobs and getting a pre-action list and purging the jobs with the abnormal rating to drain spool datasets;
    integrating the first and second sub models into a meta model;
    configuring the meta model to generate policy scripts for system spool management;
    transforming the policy scripts to executive commands for the system spool management; and
    automatically issuing and executing the executive commands for the system spool management.

2. The computer-implemented method according to claim 1, wherein:
    the historical information and the real-time information comprise job information, spool usage information and user activity information,
    the training of the first sub models to predict the first user actions with the different spool usage is based on the spool usage information and the user activity information, and
    the training of the second sub models to predict the second user actions with various job statuses is based on the job information and the user activity information.

3. The computer-implemented method according to claim 2, wherein the spool usage information comprises spool data set usage information, total CPU utilization information and job count information.

4. The computer-implemented method according to claim 2, wherein the user activity information comprises purge spool frequency information, purge size information and purge time information.

5. The computer-implemented method according to claim 2, wherein the job information comprises job type information, job name information, job start time information, job CPU information, initiator information, job spool information, and job abend information.

6. The computer-implemented method according to claim 1, further comprising collecting and storing an output of each of the first and second sub models by a timestamp as the historical information.

7. The computer-implemented method according to claim 1, further comprising iteratively updating the meta model by calculating a real hit ratio for the meta model and determining whether the real hit ratio is below and predefined threshold.

8. A computer program product for intelligently managing simultaneous peripheral operations online (spool) data sets, the computer program product comprising one or more computer readable storage media having computer readable program code collectively stored on the one or more computer readable storage media, the computer readable program code being executed by a processor of a computer system to cause the computer system to perform a method comprising:

collecting historical information and real-time information;

training, based on the historical information and the real-time information, first sub models to predict first user actions with different spool usage, the first user actions comprising a job purge action and a system check action;

training, based on the historical information and the real-time information, second sub models to predict second user actions with various job statuses, the second user actions comprising issuing a command to find jobs with highest spool usages, determining if a job has run previously and, if so, analyzing a job status with historical trends, getting an abnormal rating so the job will be left, repeating the determining, the analyzing and the getting of the abnormal rating for the other jobs and getting a pre-action list and purging the jobs with the abnormal rating to drain spool datasets;

integrating the first and second sub models into a meta model configured to generate policy scripts for system spool management;

transforming the policy scripts to executive commands for the system spool management; and automatically issuing and executing the executive commands for the system spool management.

9. The computer program product according to claim 8, wherein:

the historical information and the real-time information comprise job information, spool usage information and user activity information, the training of the first sub models to predict the first user actions with the different spool usage is based on the spool usage information and the user activity information, and the training of the second sub models to predict the second user actions with various job statuses is based on the job information and the user activity information.

10. The computer program product according to claim 9, wherein the spool usage information comprises spool data set usage information, total CPU utilization information and job count information.

11. The computer program product according to claim 9, wherein the user activity information comprises purge spool frequency information, purge size information and purge time information.

12. The computer program product according to claim 9, wherein the job information comprises job type information, job name information, job start time information, job CPU information, initiator information, job spool information, and job abend information.

13. The computer program product according to claim 8, wherein the method further comprises collecting and storing an output of each of the first and second sub models by a timestamp as the historical information.

14. The computer program product according to claim 8, wherein the method further comprises iteratively updating the meta model by calculating a real hit ratio for the meta model and determining whether the real hit ratio is below and predefined threshold.

15. A computing system comprising:

a processor;

a memory coupled to the processor; and one or more computer readable storage media coupled to the processor, the one or more computer readable storage media collectively containing instructions that are executed by the processor via the memory to implement a method for intelligently managing simultaneous peripheral operations online (spool) data sets comprising:

collecting historical information and real-time information;

training, based on the historical information and the real-time information, first sub models to predict first user actions with different spool usage, the first user actions comprising a job purge action and a system check action;

training, based on the historical information and the real-time information, second sub models to predict second user actions with various job statuses, the second user actions comprising issuing a command to find jobs with highest spool usages, determining if a job has run previously and, if so, analyzing a job status with historical trends, getting an abnormal rating so the job will be left, repeating the determining, the analyzing and the getting of the abnormal rating for the other jobs and getting a pre-action list and purging the jobs with the abnormal rating to drain spool datasets;

integrating the first and second sub models into a meta model configured to generate policy scripts for system spool management;

transforming the policy scripts to executive commands for the system spool management; and automatically issuing and executing the executive commands for the system spool management.

16. The computing system according to claim 15, wherein:

the historical information and the real-time information comprise job information, spool usage information and user activity information, the training of the first sub models to predict the first user actions with the different spool usage is based on the spool usage information and the user activity information, and the training of the second sub models to predict the second user actions with various job statuses is based on the job information and the user activity information.

17. The computing system according to claim 16, wherein the spool usage information comprises spool data set usage information, total CPU utilization information and job count information.

18. The computing system according to claim 16, wherein the user activity information comprises purge spool frequency information, purge size information and purge time information.

19. The computing system according to claim 16, wherein the job information comprises job type information, job name information, job start time information, job CPU information, initiator information, job spool information, and job abend information.

20. The computing system according to claim 15, wherein the method for intelligently managing spool data sets further comprises at least one of:

collecting and storing an output of each of the first and second sub models by a timestamp as the historical information; and iteratively updating the meta model by calculating a real hit ratio for the meta model and determining whether the real hit ratio is below and predefined threshold.

\* \* \* \* \*